US 6,621,795 B1

United States Patent
Redi et al.

(10) Patent No.: US 6,621,795 B1
(45) Date of Patent: Sep. 16, 2003

(54) BAND MANAGER FOR USE IN MULTIPLE-CHANNEL NETWORKS

(75) Inventors: Jason Keith Redi, Somerville, MA (US); Roy Allen Westerberg, Concord, MA (US); John Richard Zavgren, Jr., Acton, MA (US)

(73) Assignee: Verizon Corporate Services Group Inc., New York, NY (US)

( * ) Notice: Subject to any disclaimer, the term of this patent is extended or adjusted under 35 U.S.C. 154(b) by 0 days.

(21) Appl. No.: 09/416,335

(22) Filed: Oct. 12, 1999

(51) Int. Cl.[7] ................................................. H04J 3/16
(52) U.S. Cl. ...................... 370/235; 370/329; 370/437
(58) Field of Search ................................. 370/225, 228, 370/252, 329, 330, 437, 332, 235, 236; 455/432

(56) References Cited

U.S. PATENT DOCUMENTS

| | | | | |
|---|---|---|---|---|
| 4,627,045 A | * | 12/1986 | Olson et al. | 370/225 |
| 5,414,697 A | * | 5/1995 | Osaki | 370/236 |
| 5,850,592 A | | 12/1998 | Ramanathan | |
| 6,219,547 B1 | * | 4/2001 | Qaddoura et al. | 455/432 |
| 6,353,742 B1 | * | 3/2002 | Bach | 370/332 |
| 6,404,777 B1 | * | 6/2002 | Hattori et al. | 370/235 |

* cited by examiner

*Primary Examiner*—Salvatore Cangialosi
(74) *Attorney, Agent, or Firm*—Leonard Charles Suchyta; James K. Weixel

(57) ABSTRACT

A band manager (100) for a frequency-agile network simplifies packet transmission over multiple channels in an ad hoc network or wireless network by acting as a filter between a radio layer (104) and a network layer (102). The band manager (100) selects one channel out of multiple channels for transmitting and receiving packets, thereby taking the channel-decision making responsibility away from the components (e.g., the routing module (206), packet multiplexer (204), clustering module (210)) in the network layer (102). As a result, the radio layer (104) and the network layer (102) transmit and receive packets over a single channel selected by the band manager (100) rather than handling multiple packets over multiple channels. The inventive band manager (100) simplifies a multiple-channel network by making the network layer (102) and radio layer (104) act like a single-channel network.

36 Claims, 3 Drawing Sheets

BAND MANAGER FOR USE IN MULTIPLE-CHANNEL NETWORKS

STATEMENT REGARDING FEDERALLY SPONSORED RESEARCH OR DEVELOPMENT

This invention was made with Government support under Contract No. MDA972-98-9-0013, awarded by DARPA. The Government has certain rights in this invention.

TECHNICAL FIELD

The present invention is directed to a method and apparatus for use in a multiple-channel or frequency agile network, and more particularly to a method and apparatus that selects a channel for transmitting and/or receiving packets in a multiple channel network.

BACKGROUND ART

Ad hoc wireless networks are commonly used in military, emergency, and temporary (e.g., business meetings, campaign headquarters) networks because they do not rely on base stations or any other fixed infrastructure, making them particularly suitable for situations where communications need to be established quickly. As is known in the art, each node in an ad hoc network is normally responsible for routing the packets of other nodes in the network. As a result, nodes in an ad hoc network must employ complex routing protocols to direct packets efficiently through the network.

Different radio frequencies have different propagation characteristics. It is therefore advantageous for radio frequency devices to be frequency agile to overcome restrictive radio environments, increase available bandwidth, and/or reduce congestion on a preselected radio channel. This can be accomplished via a multiple-channel network; however, to take full advantage of the multiple channels offered by a multiple channel network, ad hoc networking protocols must be significantly more complex than protocols for a single channel network. Placing the channel decision-making capability into networking software is an option, but doing so tends to increase the complexity of the networking software dramatically. Ideally, each node should know the complete state of all links in the ad hoc network and should also be able to manage all the different types of traffic that go through each node. Such a large amount of information is further complicated if the network is designed to retransmit packets over a second channel if the first channel fails. As a result, the complexity of the network layer multiplies for each channel added to the network.

The complexity problem becomes particularly difficult when handling control messages between nodes that are trying to establish a link in the ad hoc network. Often, this function is performed by a clustering module, which broadcasts beacons, known as neighbor discovery broadcasts (NDBs), from each node on a selected channel to notify other nodes of its existence. If a node A hears beacons from node B, the two nodes attempt to establish a link via a four-way handshake. Preferably, all of the packets in the four way handshake traverse the same channel. Additionally, it is important for the NDBs to be heard on any channel, yet it is undesirable to add multiple channels, and therefore added complexity, into the clustering module to transmit multiple beacons over multiple frequencies and to determine the channel at which each beacon was transmitted.

There is a need for a method and apparatus that simplifies the networking layer for a multiple-channel network system and minimizes the number of routing and transmission decisions being made by the network.

SUMMARY OF THE INVENTION

Accordingly, the invention is directed to a band manager that is placed in a multiple channel network system. The band manager is implemented via software and simplifies the networking layer for a multiple channel network system by shielding the networking protocols from having to decide which channel to use for transmission. More particularly, the band manager filters all transmissions between the networking layer and the radio layer and decides which channel to use at any given time, thereby removing the channel decision-making function and its associated complexities from the networking layer. As a result, only the band manager, and no other component in either the networking layer or the radio layer, decides which channel to use. Further, because the band manager is the only component in the network that makes channel decisions, the other components in the network act as if the radio is a single-channel radio and as if the network is a single-channel network; the radio simply sends the packet on the one channel specified by the band manager.

DETAILED DESCRIPTION OF THE PREFERRED EMBODIMENTS

Figure 1:
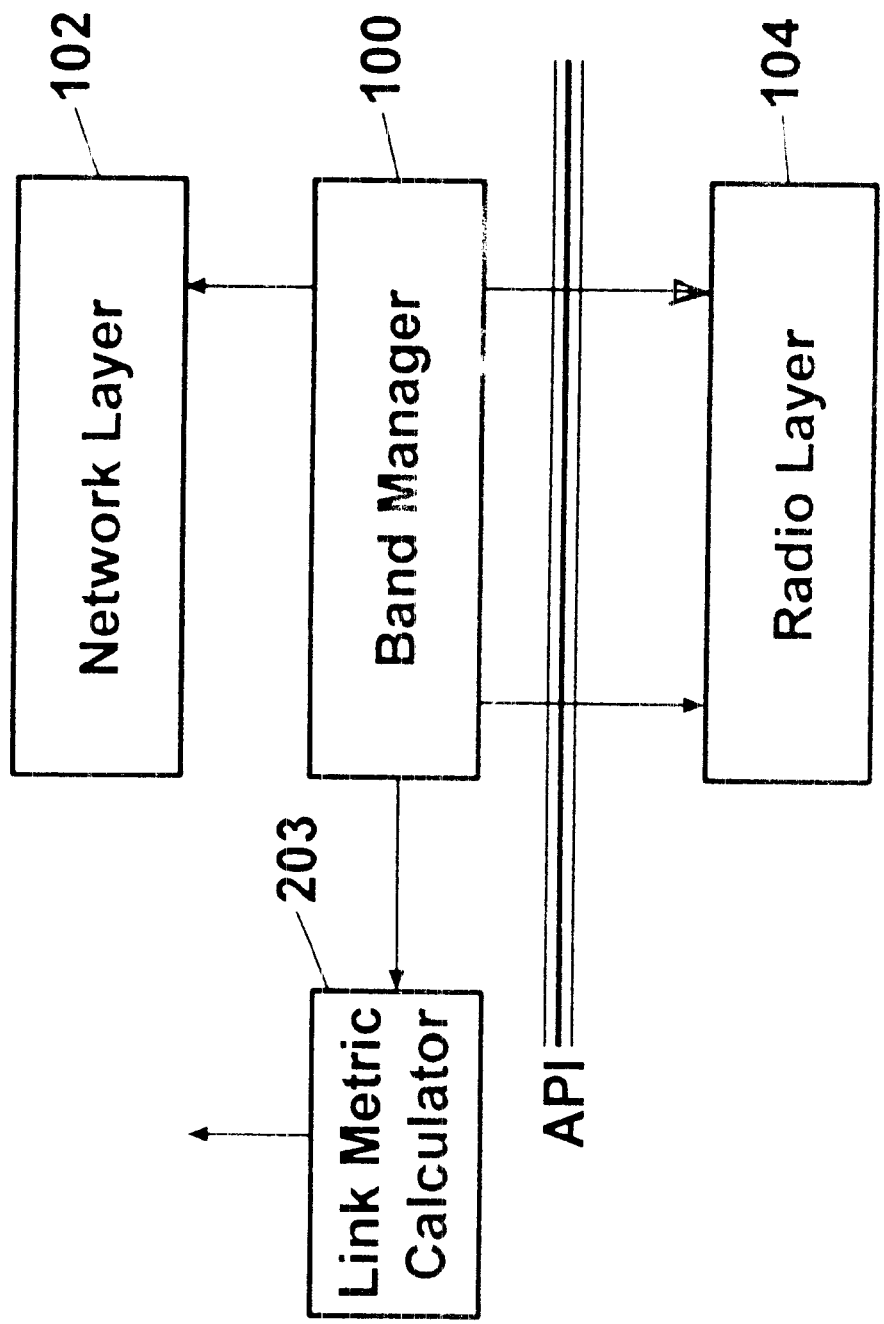
FIG. 1 is a block diagram representing the placement of an inventive band manager between a radio layer and a network layer.
Figure 2:
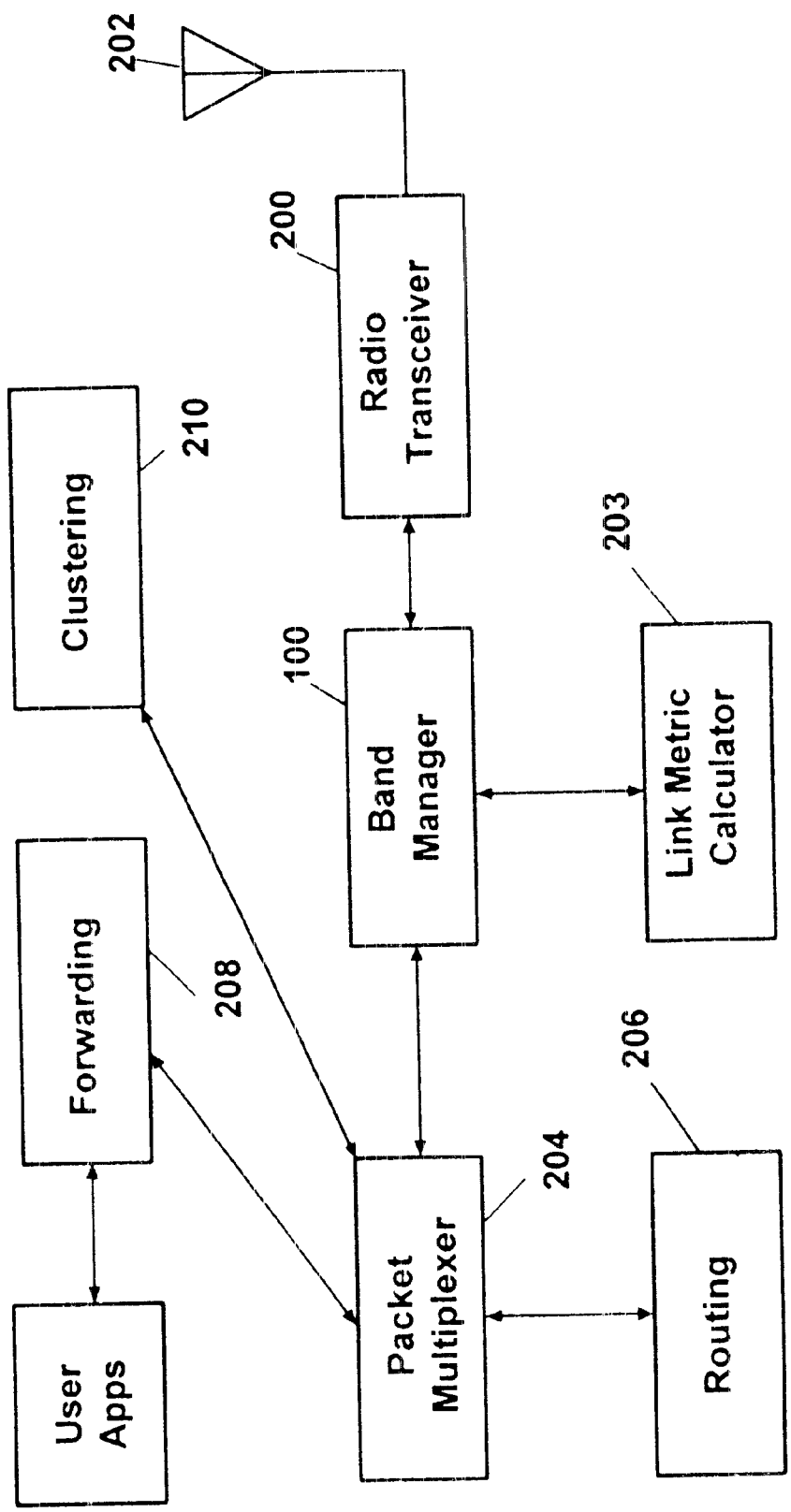
FIG. 2 is a block diagram illustrating a typical position of the inventive band manager in a network node.

FIGS. 1 and 2 illustrate the relationship between an inventive band manager 100 and the rest of a radio network. FIG. 1 shows that the band manager 100 is disposed between a network layer 102 and a radio layer 104. The radio layer 104 includes a radio, such as a multiple-frequency radio, that transmits and receives packets generated by the network over the radio frequency spectrum. The network layer 102 exchanges packets with other peer network layers to route packets through the network. In the invention, the band manager 100 filters all transmissions between the network layer 102 and the radio layer 104 while remaining completely transparent so that neither the network layer 102 nor the radio layer 104 know that the band manager 100 even exists. The band manager 100 makes all of the frequency selection decisions in the network, preventing the network layer 102 from realizing that the radio layer 104 may include a multiple frequency radio. Instead, the radio layer 104 sends the packet only on the frequency specified by the band manager 100, and the network layer 102 receives and transmits a packet as if there were only a single frequency available. In short, the band manager 100 between the network and radio layers 102, 104 respectively makes a multiple-frequency network act like a single-frequency network by usurping the frequency decision-making functions from the radio layer 104 and the network layer 102. Although the example illustrated in the figures focuses on a multiple-frequency network, the inventive band manager 100 can be used in any multiple-channel network, regardless of how the channels are divided (e.g. by frequency, time, modulation, spreading code, etc.). For simplicity and clarity, however, the invention will be described with respect to frequency selection, but those of skill in the art will understand that the same principles of the invention apply when the invention is used to select channels that are divided in other ways.

The relationship between the band manager 100 and the rest of the network is illustrated in greater detail in FIG. 2. Packets are sent between the band manager 100 and a radio transceiver 200, which is located in the radio layer 104 shown in FIG. 1. Radio signals are transmitted and received by the radio transceiver 200 through an antenna 202. A link metric calculator 203 is coupled to the band manager 100 to store information regarding the number of transmission attempts conducted by the band manager 100, which will be described in more detail below. The band manager 100 sends and receives packets to and from the network layer 102 via a packet multiplexer 204, which multiplexes the packets and sends/receives packets to a routing module 206, forwarding module 208, and/or clustering module 210. One type of network in which the inventive band manager 100 can be used is described in more detail in U.S. Pat. No. 5,850,592 to S. Ramanathan, entitled "Method for Self-Organizing Mobile Wireless Station Network", which is incorporated herein by reference.

As can be seen in FIG. 2, the band manager 100 acts as a filter between the radio transceiver 200 and the packet multiplexer 204 and selects a frequency for packet receipt and transmission. The other network components (the packet multiplexer 204, routing module 206, forwarding module 208, clustering module 210, etc.) do not even recognize that the radio transceiver 200 can receive and transmit over multiple frequencies. Similarly, the radio transceiver 200 simply sends the packet on the frequency specified by the band manager 100, without having to make any frequency decisions. Because the band manager 100 is transparent to the packet multiplexer 204 and the radio transceiver 200, the multiplexer 204 and transceiver 200 exchange and transmit packets over a single frequency selected by the band manager 100 as if they were operating in a single-frequency network rather than a multiple-frequency network. As a result, the packet multiplexer 204 and the other components in the network layer 102 can be designed to operate one frequency at a time, avoiding the added complexity that would normally occur if the frequency decision-making were conducted within the network software itself. More particularly, the band manager 100 uses all allowable frequency bands to send NDBs, ensuring that they can be detected by other nodes. The band manager 100 also selects a frequency band over which two nodes establish a link via the four-way handshake, based on the frequency on which the NDB was received to establish a link.

Figure 3:
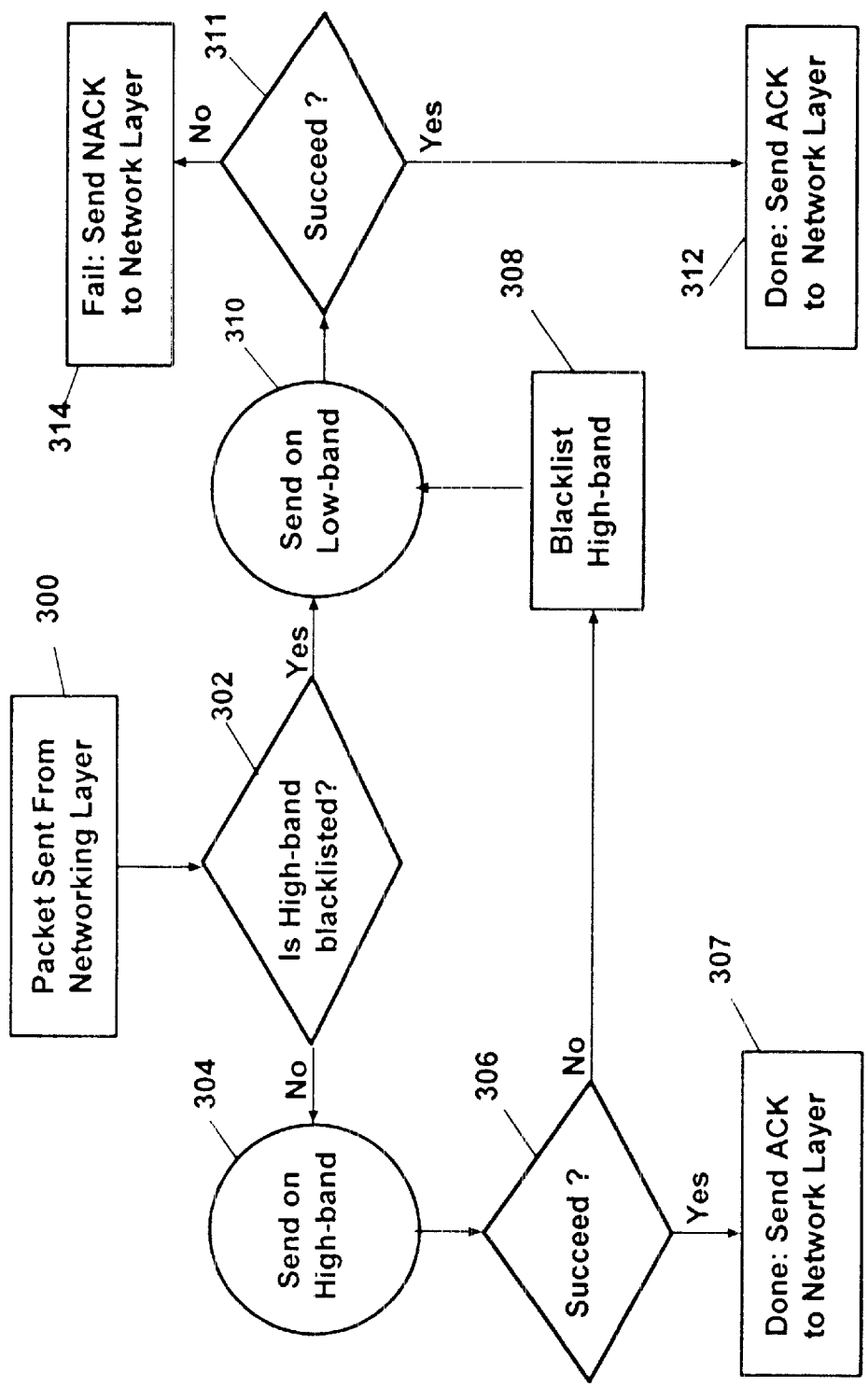
FIG. 3 is a flowchart illustrating an algorithm conducted by the inventive band manager for determining an appropriate channel for each packet to be transmitted.

FIG. 3 is a flowchart illustrating one algorithm in which the inventive band manager 100 selects a frequency band for a given packet. Although FIG. 3 shows the band manager 100 selecting a high band as a first choice between two frequency band choices, the invention is not limited to the specific embodiment illustrated. Depending on the application and the desired results, the first transmission can be conducted on any one of multiple frequencies or multiple channels, and the entire process can be repeated for any number of alternate frequencies/channels, based on any criteria selected by the user. For example, the band manager 100 could select a low band as the first choice, or the band manager 100 could select the channel for each transmission based on other criteria, as noted above.

As explained above, the band manager 100 prevents the rest of the network from recognizing that there are multiple channels, such as multiple frequency bands, available and instead allows the network to operate at one frequency selected by the band manager 100. The band manager 100 selects an appropriate band for each packet by first receiving a packet from the network layer at point 300 and determining whether the high band is blacklisted at point 302, that is, currently unavailable for use. If the high-band is not blacklisted and therefore available for transmission to a given neighboring node, a transmission on the high band will be attempted at point 304 for a preselected maximum number of times, where the maximum number of times is obtained from either the link metric calculator 203 in the network layer 102 or given at network initialization.

The band manager 100 then checks at decision point 306 to see if the transmission over the high band has succeeded. If the transmission is successful, the band manager 100 sends a transmission acknowledgement ACK to the network layer at point 307. If the high-band transmission to the given neighboring node fails after the maximum number of attempts, the high band to that node is black-listed at point 308 for a predetermined amount of time, typically on the order of several hundreds of milliseconds. The band manager 100 then attempts transmission to the same neighboring node on the low band at point 310 a preselected maximum number of times, which, as explained above, is a parameter obtained from the link metric calculator 203. If the transmission on the low band succeeds, as shown by decision point 311, the acknowledgement ACK is sent to the network layer at point 312, and the process is repeated for the next packet. If the transmission on the low band fails as well, however, the band manager 100 sends a negative acknowledgement NACK back to the network layer at point 314 before the process repeats. All transmission attempts over the high band and the low band generate parameters that are sent to the link metric calculator 203 to monitor the quality of the link and generate values for determining the maximum number of transmission attempts in future packet transmissions. Note that the invention is not limited to checking the high band first and the low band second; transmission can be first attempted on either band. Further, the negative acknowledgement NACK can be sent any time at least one of the high band transmission and low band transmission fails, depending on the application; it is not always necessary for transmission to fail in both bands before sending the negative acknowledgement. In most applications, however, the network layer 314 is concerned only if transmission fails for all of the available frequency bands in the network, indicating that a given packet cannot be sent at all.

As illustrated by reference to FIGS. 1 and 2, during transmission each NDB generated by the network nodes is sent from the clustering module 210 according to protocols as if the network were a single-channel network. The band manager 100 will duplicate the NDBs and mark one of them for high band transmission and one of them for low band transmission. These packets will always be sent at full power and at a default reservation channel data rate. If NDBs from the same node reach the band manager 100 on both the high band and the low band in less than a predetermined time window, only one NDB will be sent to the network layer 102. The predetermined time window is also a network parameter obtained from the network layer 102. If the same NDBs are received on different bands within this time window, and they both have received signal strength indication (RSSI) values which are at least above a reasonable low threshold, then the NDB from the high band will be sent up to the network layer 102. Note that the band manager 100 will pass all reception parameters to the link metric calculator 203 regardless of the link over which the parameter came from.

Once a clustering module 210 has heard enough NDBs from a particular node, the clustering module 210 will identify that node as a potential neighbor and send the information identifying the node to a routing module 206. The routing module 206 will then invoke a four-way handshake to establish an adjacency between the two neighboring nodes. The entire four-way handshake should take place over a single frequency band. If there is a failure during transmission after the band manager 100 has selected the high band, the handshake sequence starts using the low band. The blacklisting of the high-band to the neighbor should be shared with the point-to-point blacklisting list.

The functions of the band manager 100 described above can be implemented in a multiple channel network, such as a frequency-agile network, via software. Although the inventive band manager was described above with respect to simplifying wireless ad hoc networks, the band manager can be incorporated just as easily into a traditional wireless network to shield the network from having to decide which channel to use for transmitting and receiving packets. By using a band manager to remove the channel-decision making functions from the network layer, the network software can be greatly simplified while still allowing management of packet transmissions over multiple channels.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A method for selecting a channel in a multiple-channel, ad-hoc network for transmitting and/or receiving packets, comprising the steps of:
   providing a network layer and a radio layer;
   interposing a band manager between the network layer and the radio layer;
   receiving a packet from the network layer into the band manager;
   the band manager choosing a first channel and attempting transmission of the packet over a link on the first channel; and
   the band manager choosing a second channel and attempting transmission of the packet over the link on the second channel if the transmission attempt on the first channel is unsuccessful.

2. The method of claim 1, further comprising the steps of:
   sending a transmission acknowledgement to the network layer if the transmission attempt on the first channel or the transmission attempt on the second channel is successful; and
   sending a negative transmission acknowledgement to the network layer if the transmission attempt on at least one of the first channel and the second channel is unsuccessful.

3. The method of claim 2, wherein the sending step sends the negative transmission acknowledgement to the network layer if the transmission attempts for both the first and the second channels fail.

4. The method of claim 1, wherein the attempting steps include:
   generating a predetermined number of transmission attempts;
   sending the predetermined number of attempts to the band manager; and
   attempting transmission of the packet on at least one of the first channel and the second channel for the predetermined number of attempts.

5. The method of claim 2, wherein the attempting steps include:
   generating a predetermined number of transmission attempts;
   sending the predetermined number to the band manager; and
   attempting transmission of the packet over at least one of the first channel and the second channel for the predetermined number of attempts.

6. The method of claim 1, further comprising the steps of:
   setting a predetermined number of transmission attempts;
   providing a link metric calculator that monitors the quality of the link based on information regarding transmission attempts;
   blacklisting at least one of the first channel and the second channel for a predetermined time period if the transmission attempt on said at least one of the first channel and the second channel over the link is not successful after the predetermined number of attempts; and
   sending information regarding the transmission attempts from the attempting steps into the link metric calculator.

7. The method of claim 4, further comprising the steps of:
   setting a predetermined number of transmission attempts;
   providing a link metric calculator that monitors the quality of the link based on information regarding transmission attempts;
   blacklisting at least one of the first channel and the second channel for a predetermined time period if the transmission attempt on said at least one of the first channel and the second channel over the link is not successful after the predetermined number of attempts; and
   sending information regarding the transmission attempts from the attempting steps into the link metric calculator.

8. The method of claim 1, further comprising the steps of:
   checking whether the packet from the same node is received on both the first channel and the second channel within a predetermined time period; and
   selecting one packet from the first channel or the second channel for transmission to the network layer.

9. The method of claim 1, wherein the number of channels in the multiple-channel network is greater than two, and wherein the method further comprises repeating the attempting steps for different channels until the packet is transmitted successfully.

10. The method of claim 9, further comprising the steps of:
    sending a transmission acknowledgement to the network layer if the transmission attempt on any of the channels in the multiple channel network is successful; and
    sending a negative transmission acknowledgement to the network layer if the transmission attempts for all of the channels in the multiple-channel network are unsuccessful.

11. The method of claim 1, wherein the channels are divided on the basis of at least one from the group consisting of frequency, time, modulation, and spreading code.

12. A multiple-channel packet transmission ad-hoc network comprising:

a network layer;

a radio layer; and, a band manager interposed between the network layer and the radio layer for deciding which channel to use for transmitting the packet, wherein the band manager chooses a first channel and attempts transmission of the packet over a link on the first channel and chooses a second channel and attempts transmission of the packet over the link on the second channel if the transmission attempt over the first channel is unsuccessful.

13. The network of claim 12, wherein the band manager is adapted to send a transmission acknowledgement to the network layer if the transmission attempt on the first channel or on the second channel is successful and to send a negative transmission acknowledgement to the network layer if the transmission attempt on at least one of the first channel and the second channel is unsuccessful.

14. The network of claim 13, wherein the band manager sends the negative transmission acknowledgement to the network layer if the transmission attempts for both the first and second channels are unsuccessful.

15. The network of claim 12, wherein the network layer generates a predetermined number of attempts and sends the predetermined number to the band manager, and wherein the band manager is adapted to attempt transmission of the packet on at least one of the first channel and the second channel for the predetermined number of attempts.

16. The network of claim 13, wherein the network layer generates a predetermined number of attempts and sends the predetermined number to the band manager, and wherein the band manager is adapted to attempt transmission of the packet on at least one of the first channel and the second channel for the predetermined number of attempts.

17. The network of claim 12, further comprising a link metric calculator coupled to the band manager that monitors the quality of the link, and wherein the band manager is adapted to blacklist at least one of the first channel and the second channel for a predetermined time period if the transmission attempt on said at least one of the first channel and the second channel on the link is not successful after a predetermined number of attempts and sends information regarding the transmission attempts from the attempting steps into the link metric calculator.

18. The network of claim 15, further comprising a link metric calculator coupled to the band manager that monitors the quality of the link, and wherein the band manager is adapted to blacklist at least one of the first channel and the second channel for a predetermined time period if the transmission attempt on said at least one of the first channel and the second channel on the link is not successful after a predetermined number of attempts and sends information regarding the transmission attempts from the attempting steps into the link metric calculator.

19. The network of claim 12, wherein the band manager is further adapted to check whether the packet from the same node is received on both the first channel and the second channel within a predetermined time period and select one packet from the first channel or the second channel for transmission to the network layer.

20. The network of claim 12, wherein the number of available channels is greater than two, and wherein the band manager repeatedly attempts transmission over different channels until the packet is transmitted successfully.

21. The network of claim 20, wherein the band manager is adapted to send a transmission acknowledgement to the network layer if the transmission attempt on any of the channels in the multiple-channel network is unsuccessful, and adapted to send a negative transmission acknowledgement to the network layer if the transmission attempts for all of the channels in the multiple-channel network are unsuccessful.

22. The network of claim 12, wherein the channels are divided on the basis of at least one from the group consisting of frequency, time, modulation, and spreading code.

23. A computer-readable storage device containing a band manager for an ad-hoc transmission network, the band manager being adapted to be interposed between a network layer and a radio layer, comprising:

a receiver included within the band manager that receives a packet from the network layer; and, a transmitter included within the band manager that chooses a first channel and attempts transmission of the packet over a link on the first channel and chooses a second channel and attempts transmission of the packet on the second channel if the transmission attempt over the first channel is unsuccessful.

24. The storage device of claim 23, wherein the band manager further comprises an acknowledger that sends a transmission acknowledgement to the network layer if the transmission attempt on the first channel or the second channel is successful and that sends a negative transmission acknowledgement to the network layer if the transmission attempt on at least one of the first channel and the second channel is unsuccessful.

25. The storage device of claim 24, wherein the band manager sends the negative transmission acknowledgement to the network layer if the transmission attempts for both the first and the second channels are unsuccessful.

26. The storage device of claim 23, wherein the network layer generates a predetermined number of attempts and sends the predetermined number of attempts to the band manager, and wherein the band manager attempts transmission for the predetermined number of attempts.

27. The storage device of claim 24, wherein the network layer generates a predetermined number of attempts and sends the predetermined number of attempts to the band manager, and wherein the band manager attempts transmission for the predetermined number of attempts.

28. The storage device of claim 23, wherein the network further comprises a link metric calculator that is coupled to the band manager and that monitors the quality of the link, and wherein the band manager is adapted to blacklist at least one of the first channel and the second channel for a predetermined time period if the transmission attempt on said at least one of the first channel and the second channel on the link is not successful after a predetermined number of attempts and sends information regarding the transmission attempts from the attempting steps into the link metric calculator.

29. The storage device of claim 26, wherein the network further comprises a link metric calculator that is coupled to the band manager and that monitors the quality of the link, and wherein the band manager is adapted to blacklist at least one of the first channel and the second channel for a predetermined time period if the transmission attempt on said at least one of the first channel and the second channel on the link is not successful after a predetermined number of attempts and sends information regarding the transmission attempts from the attempting steps into the link metric calculator.

30. The storage device of claim 23, wherein the band manager is further adapted to check whether the packet from the same node is received on both the first channel and the second channel within a predetermined time period and select one packet from the first channel or the second channel for transmission to the network layer.

31. The storage device of claim 23, wherein the number of available channels is greater than two, and wherein the band manager repeatedly attempts transmission over different channels until the packet is transmitted successfully.

32. The storage device of claim 31, wherein the band manager is adapted to send a transmission acknowledgement to the network layer of the transmission attempt on any of the channels in the multiple-channel network is successful, and adapted to send a negative transmission acknowledgement to the network layer if the transmission attempts for all of the channels in the multiple-channel network are unsuccessful.

33. The storage device of claim 23, wherein the channels are divided on the basis of at least one from the group consisting of frequency, time, modulation, and spreading code.

34. A method for selecting transmission channels in a multiple-channel, ad-hoc network in which packets are transmitted between network nodes to a final destination node, said method comprising:

providing a network layer and a radio layer;

interposing a band manager between said network layer and said radio layer;

receiving one of said packets from said network layer into said band manager at a first one said network nodes;

providing a link between said first one of said network nodes and another one of said network nodes;

said band manager first choosing a first one of said channels and first attempting to transmit said one of said packets over said link on said first one of said channels;

said band manager next choosing a second one of said channels and next attempting to transmit said one of said packets over said link on said second one of said channels if said first attempting to transmit is unsuccessful;

if said next attempting is unsuccessful, repeating said first attempting and said next attempting until said one of said packets is successfully transmitted to said another one of said network nodes; and, repeating said receiving, said link providing, said first attempting, said next attempting and said repeating for successive ones of said another one of said network nodes until said final destination node has successfully received said one of said packets.

35. The method of claim 34 wherein said first attempting is repeated a first preselected maximum number of times before operation of said next selecting.

36. The method of claim 35 wherein said next attempting is repeated a second preselected maximum number of times before said repeating said first attempting.

* * * * *